United States Patent [19]
Peckham

[11] 3,815,994
[45] June 11, 1974

[54] SYSTEM AND METHOD FOR MEASURING DISTANCE

[75] Inventor: Vernon D. Peckham, Colorado Springs, Colo.

[73] Assignee: Kaman Sciences Corporation, Colorado Springs, Colo.

[22] Filed: Mar. 31, 1972

[21] Appl. No.: 240,015

[52] U.S. Cl.......................... 356/4, 356/5, 250/205, 343/12 R
[51] Int. Cl............................................... G01c 3/08
[58] Field of Search .................... 356/4, 5; 250/205; 95/44 C; 343/12 R, 12 A

[56] References Cited
UNITED STATES PATENTS

| | | | |
|---|---|---|---|
| 2,206,036 | 7/1940 | Herson................................ | 343/12 R |
| 3,582,661 | 6/1971 | Emmasingel......................... | 250/205 |
| 3,608,547 | 9/1971 | Sato et al.............................. | 128/6 |
| 3,679,307 | 7/1972 | Zoot et al............................. | 356/4 |

Primary Examiner—Richard A. Farley
Assistant Examiner—S. C. Buczinski
Attorney, Agent, or Firm—Edwards, Spangler, Wymore & Klaas

[57] ABSTRACT

Disclosed are a pair of light intensity detectors spaced apart in range. Included is an arrangement for reflecting light from a target to each detector and maintaining the intensity of the reflected light detected by one detector constant whereby the output signal of the other detector is a measure of range. Included is an arrangement for processing, linearizing and displaying the signal representing target range. The system disclosed employs the method of reflecting electromagnetic energy of varying intensity from a target to maintain the intensity of reflected energy at one position constant while monitoring intensity at a second position to measure range.

25 Claims, 6 Drawing Figures

SYSTEM AND METHOD FOR MEASURING DISTANCE

The present invention relates to distance measuring and more particularly to an improved system and method for measuring the distance to a target.

It is a known law of physics that the intensity of light received from a point source of light is inversely proportional to the square of the distance from the point source. Accordingly, it theoretically follows that distance to a target may be measured by reflecting a light beam of a known intensity from a target and detecting the intensity of the reflected beam.

A problem inherent with this method of measuring distance to a target is that the light absorbing characteristics of different targets vary so that the intensity of the reflected light beam detected varies not only as a function of target distance, but also as a function of target absorption. Frequently, the light absorption characteristic of the target is not known and oftentimes depends on the portion of the target from which light is being reflected. As a consequence of these unknown variations in target absorptions, accurate and dependable distance determinations cannot generally be made by simply reflecting a light beam or other form of energy of a known intensity from a target and detecting the intensity of the reflected light or energy.

It is, accordingly, an object of the present invention to provide an improved dependable system and method for accurately measuring the distance to a target by detecting the intensity of electromagnetic radiation, particularly light, reflected therefrom.

It is, further, an object of the present invention to provide an improved distance measuring system as set forth which is capable of automatically compensating for variations in the light or energy absorbing and reflecting characteristics of different targets.

In accomplishing these and other objects, there is provided in accordance with the present invention a system for measuring distance to a target by detecting the intensity of a light beam reflected therefrom. The system includes a variable intensity light source for generating a light beam to illuminate a target and a pair of light detectors for measuring the intensity of the light beam reflected from the target. The light detectors are spaced apart in range a predetermined distance along the path of the reflected light beam so that the intensity of the detected signals vary as a function of their distance apart in relation to the distance from the target. A feedback-gain control arrangement is included which maintains the signal detected by one of the light detectors constant by utilizing this signal to control the intensity of the light beam generated by the light source. Thereby, variations in the light absorption and reflection characteristics of different targets is compensated for. A differential amplifier is included for combining the signals detected by both light detectors to produce a differential output signal which is nonlinearly proportional to target distance. Apparatus may be included for nonlinearly amplifying the differential output to produce an output which is a linear function of target distance. Apparatus may also be provided for displaying the differential output signal representing target distance.

Additional objects of the present invention reside in the specific construction of the exemplary distance measuring system hereinafter particularly described in the specification and shown in the several drawings and in its method of operation.

Figure 1:
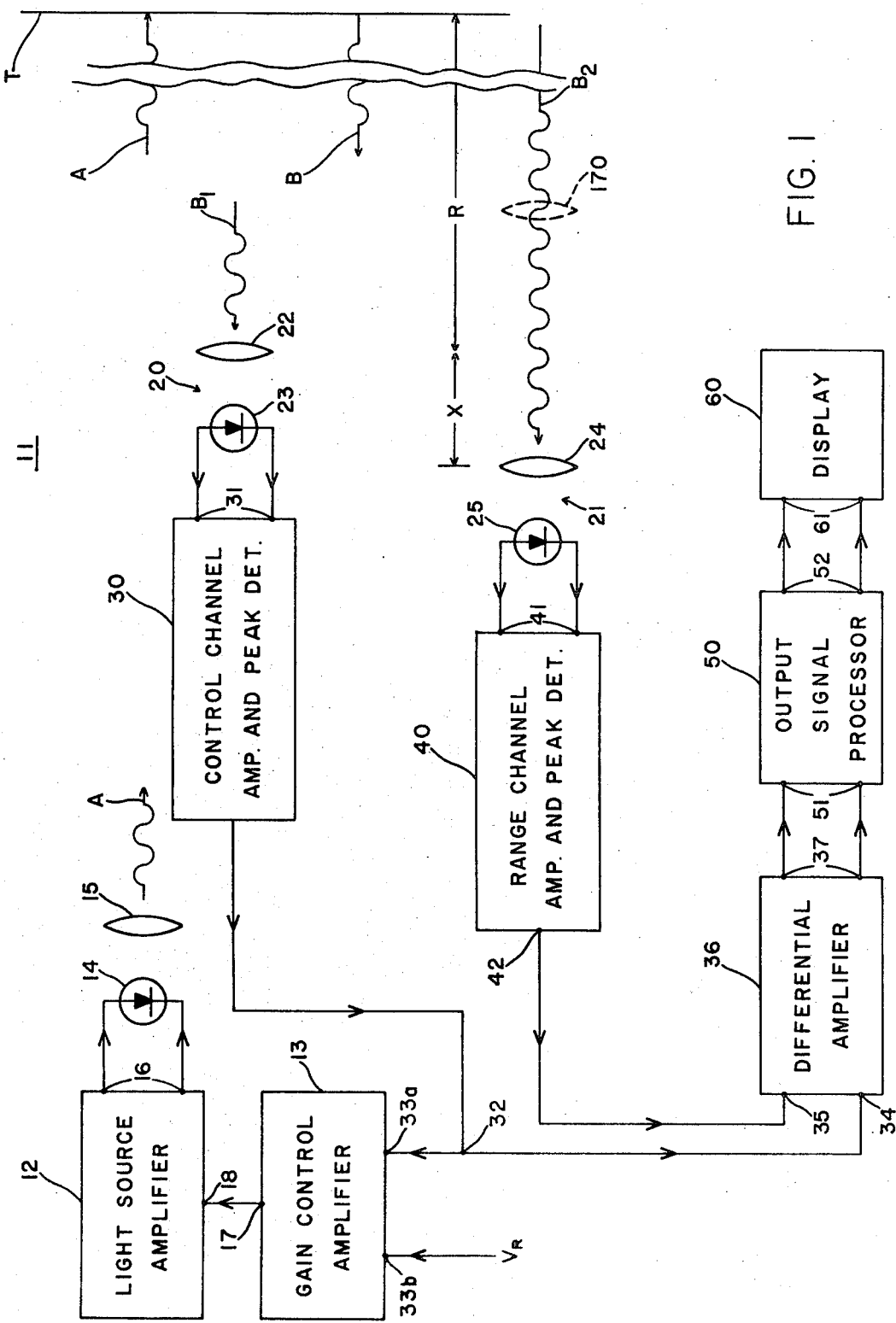
FIG. 1 is a block diagram of a distance measuring system according to the present invention.

Referring to the drawings in more detail, there is shown in FIG. 1 a distance measuring system generally designated by the numeral 11. The system 11 includes a variable intensity light source for generating a light beam A to illuminate a target T.

The variable intensity light source is made up of a light source amplifier 12, a gain control amplifier 13, a light emitting element 14, a laser or light emitting diode, and a collimating lens 15. The laser diode 14 is connected to the output terminals 16 of the light source amplifier 12 and the output terminal 17 of the gain control amplifier 13 is connected to the gain control input terminal 18 of the amplifier 12. The collimating lens 15 is positioned to collimate the light emitted by the laser diode 14, thereby to form the collimated light beam A, and the laser 14 and lens 15 are optically aligned to illuminate the target T with the collimated light beam A.

Figure 2:
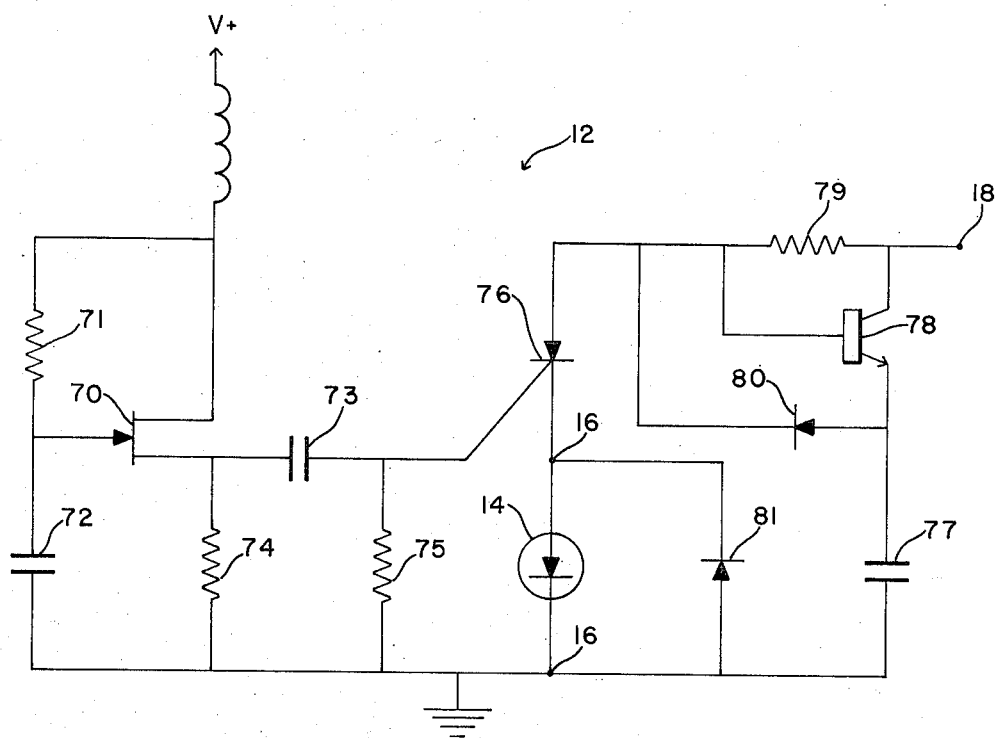
FIG. 2 is a circuit diagram of the light source amplifier of FIG. 1.

It is noted that the light emitting element 14 may preferably be a gallium-arsenide laser diode of the type capable of producing short but intense infrared light pulses in one embodiment approximately 3,000 times a second. It is further noted that the light source amplifier 12 may be operated in either a pulsed or continuous amplitude modulated mode to drive the laser diode 14. An exemplary light source amplifier 12 which operates in a pulsed mode is illustrated in FIG. 2 and is discussed hereinafter.

A portion of the light beam A is reflected by the target T. The percent of the light beam A reflected depends upon the reflection and absorption characteristics of the portion of the target T reflecting the beam A. The reflected light is designated light B. The reflected light B appears to emanate from a point light source located at the point of reflection of the beam A from the target T and this apparent point light source is referred to hereinafter as the apparent target source. The intensity of the apparent target source is designated $I_0$.

A pair of light intensity detecting means 20 and 21 are included in the measuring system 11. The light intensity detecting means 20 and 21 are positioned with respect to the light-emitting diode 14 and the collimating lens 15 to be in the path of the light B reflected from the target T, thereby to receive and detect the intensity of the reflected light B.

The light detecting means 20 is made up of a focusing lens 22 positioned to focus light on a light intensity detecting element 23. The light detecting means 21 is similarly constructed being made up of a focusing lens 24 and a light intensity detecting element 25. Silicon diode photodetectors are preferably employed as the light intensity detecting elements 23 and 25. The silicon diodes employed are operable to respond to very short light pulses and emit a current proportional to the amplitude of the light incident on the diode junction.

The focusing lens 22 is positioned in the measuring system 11 to receive the portion of the reflected light B designated $B_1$ and focuses the light $B_1$ onto the light detector 23. The lens 22 is located a distance designated R from the target T. As hereinafter explained, the measuring system 11 operates to determine this unknown distance R, thereby to measure range to the target T.

The focusing lens 24 included in the other light detecting means 21 is positioned in the measuring system 11 a predetermined distance X behind the focusing lens 22 to receive the portion of the reflected light B designated $B_2$. The lens 24 focuses the light $B_2$ onto the light detector 25. It is noted that the distance X, as the distance R, is measured along the path of the reflected light B, i.e., along radii drawn from the apparent target light source to the focusing lenses 24 and 22. Thus, the range to the focusing lens 24 is equal to the distance R+X with the distance X being known.

The light detectors 23 and 25 sense the light beam portions $B_1$ and $B_2$, respectively, which are focused or directed thereon by the lens 22 and 24, and are each operable to generate electrical output signals across their terminals which are linearly proportional to the intensity of the light sensed. The detector 23 along with an amplifier and peak detector circuit 30 forms a control channel in the system 11. The amplifier and peak detector 30 has input terminals 31 and an output terminal 32. The light detector 23 is connected across the input terminals 31. The output terminal 32 is connected to an input terminal 33a of the gain control amplifier 13 and also to one input terminal 34 of a conventional differential amplifier 36. A reference voltage designated $V_R$, which may for example be +50 volts, is applied to another input terminal 33b of the gain control amplifier 13.

A so-called range channel is also included in the measuring system 11. The range channel is formed by an amplifier and peak detector circuit 40 and the light intensity detecting means 21. The circuit 40 has input terminals 41 and an output terminal 42. The diode light detector 25 is connected between the input terminals 41 and the circuit output terminal 42 is connected to an input terminal 35 of the differential amplifier 36.

Figure 4:
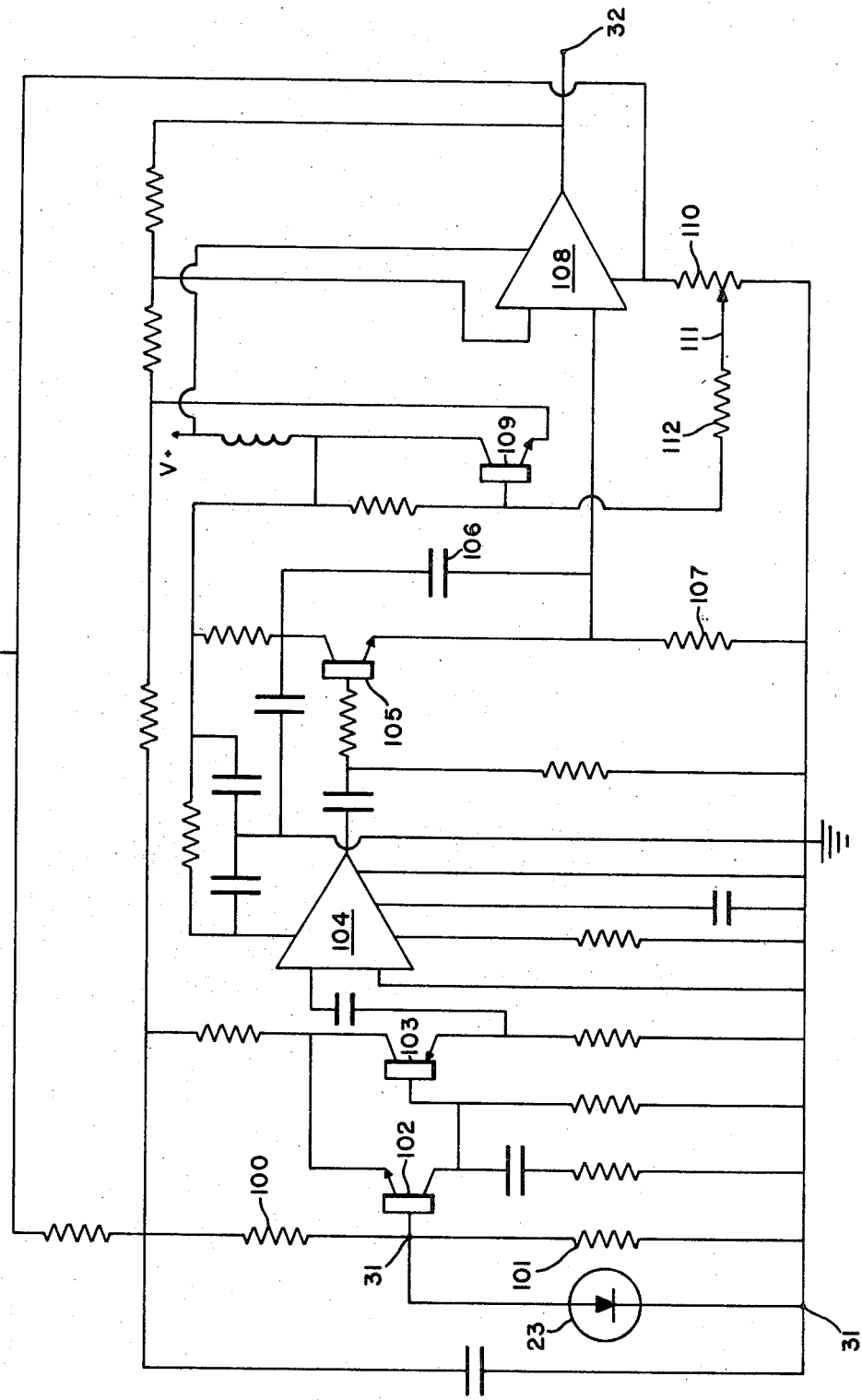
FIG. 4 is a circuit diagram of one amplifier and peak detector circuit suitable for use as the control channel amplifier and peak detector of FIG. 1 and also suitable for use as the range channel amplifier and peak detector thereof.

The amplifier and peak detector circuits 30 and 40 each operate to preamplify the light pulses detected by their associated diode detectors to boost the electrical signals representing light intensity to levels high enough to be converted to d.c. voltage levels by a peak detector included in the circuitry. An exemplary form of amplifier and peak detector circuit is illustrated in FIG. 4 which may be employed as the amplifier and peak detector circuits 30 and 40. The circuitry illustrated in FIG. 4 is discussed hereinafter.

The gain control amplifier 13 receives at its intput terminals 33a and 33b the d.c. output of the peak detector 30 and the fixed reference voltage $V_R$. The amplifier 13 operates as a d.c. amplifier to amplify the resultant input, which input is a function of the d.c. output level of the system control channel. The amplified output of the gain control amplifier 13 is applied to the input terminal 18 of the light source amplifier 12 as negative feedback to control the gain of the light source amplifier 12.

In this manner a feedback loop is formed from the peak detector 30 to the light source amplifier 12 which operates to reduce the voltage signal driving the light source amplifier 12 as the output of the peak detector 30 increases and vice versa. Thereby, the gain of the light source amplifier 12 and the intensity of the light beam A generated is varied in proportion to the detected intensity of the light portion $B_1$ to maintain the intensity of the detected light $B_1$ substantially constant.

As a result, the intensity of the transmitted light beam A varies in direct proportion to the distance to the target T and the light absorption characteristic of the target surface. For example, a decrease in target distance T generally results in a decrease in the intensity of the light beam A being generated while an increase in the percent of incident light being absorbed by the surface of the target T generally causes an increase in the intensity of light beam A. As a consequence, for reasons hereinafter explained, variations in the light absorbing and reflecting characteristics of the surfaces of targets are automatiallly compensated for.

Figure 3:
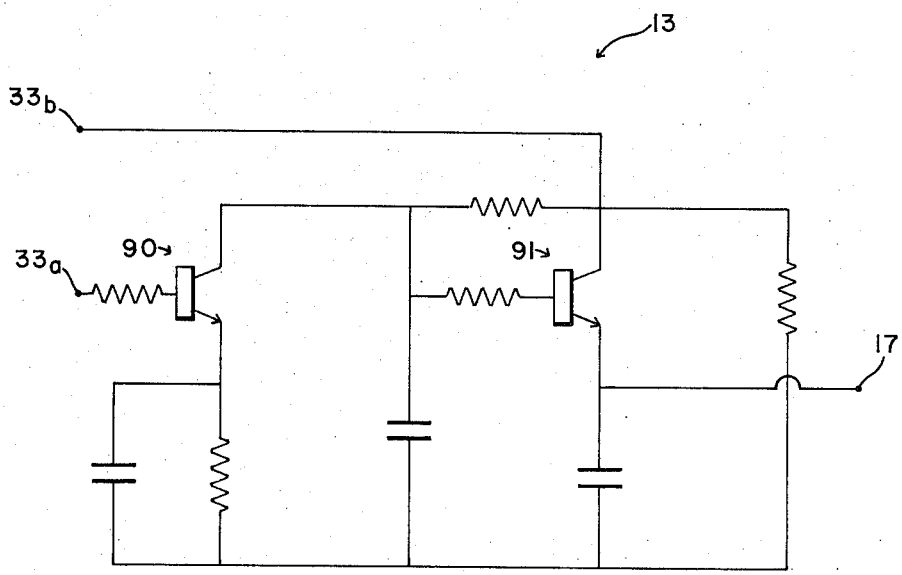
FIG. 3 is a circuit diagram of the gain control amplifier of FIG. 1.

The circuitry of an exemplary gain control amplifier 13 is illustrated in FIG. 3. This circuitry is discussed in greater detail hereinafter.

The aforementioned differential amplifier 36 operates in a conventional manner to combine and amplify the outputs on the system's control and range output terminals 32 and 42, respectively, to generate a differential output voltage on its output terminals 37. This differential output voltage generated on terminals 37 is, as is hereinafter explained, a known nonlinear function or measure of the target range R.

The differential amplifier output terminals 37 are connected to the input terminals 51 of an output signal processor 50. The output signal processing circuit 50 has output terminals 52, is conventional in construction and operation, and operates to nonlinearly amplify the differential output signal representing target range to produce a range output signal which is a linear function of the target distance R. The linear range signal on the processor output terminals 52 is transmitted to the input terminals 61 of a conventional display means 60. The dispaly 60 operates in a conventional manner to display the linear output signal representing target range T.

Before discussing the overall operation of the distance measuring system 11, a description of the construction and operation of the exemplary circuit components illustrated in FIGS. 2–6 is next given.

An exemplary light source amplifier 12 of the pulse type is shown in FIG. 2. The amplifier 12 there shown includes a free running relaxation oscillator formed by a field effect transistor (FET) 70, a resistor 71 and a capacitor 72. The oscillator operates to generate trigger pulses on the drain electrode of the FET 70. Each trigger pulse charges a capacitor 73 at a predetermined rate determined by the R-C constant of the charging circuit formed by the capacitor 73 and a resistor 74. The charge on the capacitor 73 is applied by resistor 75 to the control electrode of a silicon control rectifier (SCR) 76 to trigger the SCR 76 into conduction. The relaxation oscillator thereby operates to periodically trigger the SCR 76 into conduction, preferably at a rate of 2000 to 5000 Hertz.

Each time the SCR 76 is triggered into conduction, the charge accumulated on a capacitor 77 is discharged through the laser diode 14, thereby to pulse the laser 14 and generate light pulses which form light beam A. The capacitor 77 discharges along the current path defined by a diode 80, the path of conduction of the SCR 76 and the laser diode 14. The intensity of the light pulse or beam A generated by the laser 14 is directly proportional to the charge accumulated on the capacitor 77 at the instant the SCR 76 is triggered into conduction. Once the current flow through the SCR 76 decreases to a predetermined level, the SCR 76 ceases to conduct until the next trigger pulse is applied to its control electrode.

Following each discharge of the capacitor 77, the SCR 76 ceases to conduct and the capacitor 77 is recharged by a voltage controlled current source made up of an NPN transistor 78 and a bias resistor 79. A diode 81, connected in parallel with the laser 14, functions to limit the reverse voltage across the laser 14 to a safe level. The voltage to which the capacitor 77 is charged by the transistor current source 78 controls the intensity of the light pulses, and thus the light beam A, generated by the laser 14.

The rate at which capacitor 77 is charged by the transistor current source 78 is proportional to the d.c. control voltage applied to its collector electrode and to its base electrode through the base electrode biasing resistor 79. The collector electrode of the transistor 78 is connected to the light source amplifier input terminal 18 to receive the control voltage generated on the gain control amplifier output terminal 17. As explained, the gain control amplifier 13 operates to generate an output voltage which decreases as the intensity of the light $B_1$ increases. Thereby, the voltage to which the capacitor 77 is charged decreases as the intensity of the reflected light $B_1$ increases and conversely, the voltage to which the capacitor 77 is charged increases as the intensity of the reflected light $B_1$ decreases. As explained, the gain control amplifier 13 operates to generate an output voltage proportional to the difference between the reference voltage $V_R$ and the intensity of the light $B_1$. The charging rate is established by the base electrode bais resistor 79 so that the capacitor 77 is charged to the control voltage at input terminal 18 before the arrival of the next trigger pulse on the gate electrode of the SCR 76.

It is noted that during operation of the exemplary variable intensity light source 12 that typical currents through the laser diode 14 are 10 to 40 amperes for durations on the order of 0.2 microseconds.

FIG. 3 illustrates an exemplary gain control amplifier 13 with its input terminals 33a, 33b and its output terminal 17. The amplifier 13 is a conventional d.c. amplifier and includes two transistor amplifier stages 90 and 91. The first transistor stage 90 amplifies the d.c. output level received at input terminal 33a from the peak detector 30. This d.c. voltage level received at the terminal 33a represents and is directly proportional to the intensity of the reflected light $B_1$.

The second transistor amplifier stage 91 combines the amplified signal from amplifier stage 90 with the d.c. reference voltage $V_R$ applied to the input terminal 33b to produce a control voltage on the output terminal 17 which is proportional to the difference of the intensity of the reflected light $B_1$ and the reference voltage $V_R$. This gain control signal generated at the output terminal 17 which is proportional to the intensity of the reflected light $B_1$ is produced by appropriately selecting the magnitude and polarity of the reference voltage $V_R$ with respect to the amplified output voltage of the transistor stage 90. Thus, the gain control amplifier 13 connected between the peak detector 30 and the light source amplifier 12 completes a feedback loop which operates to reduce the control voltage level supplied to the light source amplifier 12 whenever the intensity of the reflected light $B_1$ increases and vice versa.

FIG. 4 illustrates an exemplary amplifier and peak detector circuit which may be employed both in the control and range channels of the system 11. The circuitry of FIG. 4 is described with reference to the control channel amplifier and peak detector 30. It is to be understood, however, that an identical type of amplifier and peak detector circuit may also be, and preferably is, employed as the range channel amplifier and peak detector 40.

The amplifier and peak detector circuit 30 shown in FIG. 4 includes a preamplifier portion and a peak detector portion. The preamplifier portion receives the current signals generated by the detecting element 23 which are proportional to the intensity of the light pulses $B_1$ reflected from the target T. These current pulses generated by the detecting element 23 are converted to voltages by resistors 100 and 101 biasing a buffer transistor 102. The transistor 1–2 in combination with a transistor 103 forms a conventional coupled pair video amplifier which has a bandwidth sufficiently great to accommodate the short light pulses $B_1$ detected by the detecting element 23.

The amplified output of the transistor pair 102 and 103 is transmitted as an input signal to a commercially available integrated circuit amplifier 104 which preferably has a 35 megahertz bandwidth. The transistors 102, 103 and the amplifier 104 make up the preamplifier portion of the circuit 30.

The pulsed output of the amplifier 104, which represents the light pulses $B_1$ sensed by the detecting element 23, is transmitted to transistor 105 in the peak detector portion of the circuit 30. The transistor 105 operates as a high impedance input peak detector and a voltage signal representative of the amplitude of the reflected light pulses $B_1$ is generated on the emitter electrode of the transistor 105. A filter is provided by a capacitor 106 and resistor 107 to control the bandwidth of the voltage signal transmitted from the emitter electrode of the transistor 105 to an integrated circuit amplifier 108. The time constant of the capacitor 106 and resistor 107 combination is typically set at five to ten times the time interval between the trigger pulses generated by the relaxation oscillator in the light source amplifier 12.

The integrated circuit amplifier 108 also forms a part of the peak detector portion of the circuit 30. The amplifier 108 is of a commercially available type and operates to amplify the difference signal between the output signal generated by the transistor 105 and an offset voltage generated by a transistor 109. The transistor 109 is biased to generate a d.c. voltage which is used to offset the temperature coefficient of the peak detector transistor 105. A d.c. output voltage is thus generated by the amplifier 108 on the circuit terminal 32 which is directly proportional to the intensity of the reflected light $B_1$ sensed by the element 23.

A conventional arrangement for adjusting the bias voltage applied to the base electrode of the transistor 109 is shown. The arrangement includes a resistor 110 having an adjustable voltage pickoff 111. The voltage pickoff 111 is connected through resistor 112 to the base electrode of the transistor 109. Thereby, by adjusting the position of the voltage pickoff 111, the output level of the amplifier 108 may be shifted without interfering with the voltage signal representing the intensity of the reflected light $B_1$.

Figure 5:
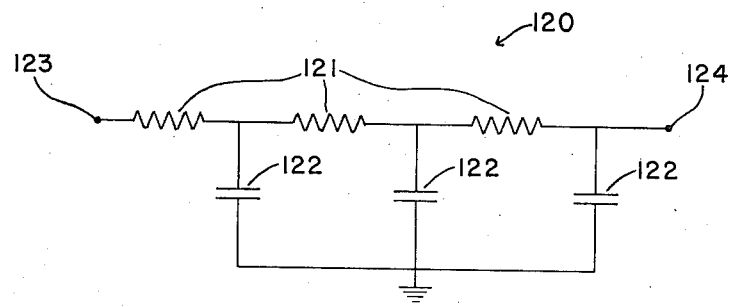
FIG. 5 is a circuit diagram of one type of filter which may be connected in the distance measuring system of FIG. 1 to filter the inputs to the differential amplifier thereof.

Shown in FIG. 5 is a conventional R-C filter circuit 120 made up of resistors 121 and capacitors 122. The filter circuit is designed to limit the frequency ranges of the output voltages of the amplifier and peak detector circuits 30 and 40 to a specified range, such as up to 200 Hertz. The filter circuit 120 has an input terminal 123 and an output terminal 124. While use of filter circuits 120 is not shown in the system 11 in FIG. 1, they may be connected in the system 11 between each input terminal of the differential amplifier 36 and the associated output terminals of the amplifier and peak detector circuits 30 and 40.

In inserting one of the filters 120 between the circuit 30 and the differential amplifier 36, the connection between the terminals 32 and 34 is broken, the filter input terminal 123 is connected to the circuit output terminal 32, and the filter output terminal 124 is connected to the differential amplifier input terminal 34. Another one of the filters 120 may be inserted in a similar manner between the circuit 40 and the differential amplifier 36 by breaking the connection between the terminals 42 and 135, commonly connecting terminals 42 and 123, and also commonly connecting terminals 35 and 124.

The circuit components hereinbefore described are biased by supply voltages which are designated in the drawings as V+, V− and $V_R$ are all referenced with respect to ground and had the values of +15 volts, −15 volts and +50 volts, respectively, in an exemplary system 11 constructed.

Figure 6:
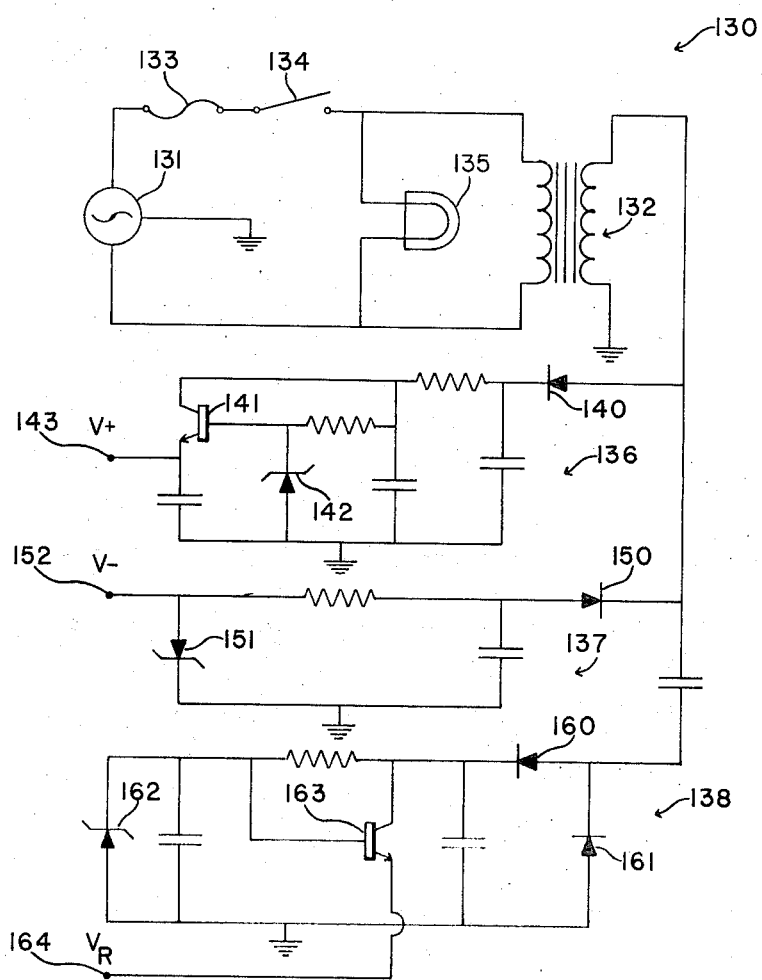
FIG. 6 is a circuit diagram of one power supply suitable for use with the distance measuring circuit of FIG. 1.

FIG. 6 illustrates an exemplary power source 130 for generating the V+, V− and $V_R$ d.c. voltages. The power supply 130 converts alternating current supplied by an a.c. source 131 to direct currents by employing conventional diode circuitry. The a.c. source 131 is preferably a 115 volt, 60 hertz source. The a.c. source 131 is connected in the power supply 130 to the primary winding of a transformer 132. A fuse 133 is provided to protect the power supply 130. A switch 134 is also provided for energizing the power supply and a lamp 134 is provided to indicate that the power supply is energized.

The transformer 132 operates to generate on its secondary winding an a.c. voltage signal, for example, a 32 volt 60 hertz signal, for supply to three a.c.-d.c. voltage converters 136, 137 and 138. Each of the convertors 136–138 is connected to the secondary winding of the transformer 132.

The voltage convertor 136 includes a diode 140 which functions as a half wave rectifier to transmit the positive half of the a.c. output of the transformer 132. Power is supplied through the diode 140 to a conventional series regulator circuit formed by a transistor 141 and a zener diode 142. The a.c.-d.c. convertor 136 operates in a conventional manner to produce on its output terminal 143 a filtered positive d.c. supply voltage. This supply voltage produced is the hereinbefore mentioned supply voltage V+.

The voltage convertor 137 includes a diode 150 which functions as a half wave rectifier to transmit the negative half of the a.c. output of the transformer 132. The convertor 137 includes a zener diode 151 and operates as a conventional zener diode voltage regulator to generate on its output terminal 152 the negative d.c. supply voltage V−.

The voltage convertor 138 includes diodes 160 and 161. Each of the diodes 160–161 function as half wave rectifiers, but each transmits an opposite half of the a.c. voltage signal received from the transformer 132. The rectified voltage signals from the diodes 160–161 are applied to a conventional series voltage regulator formed by a zener diode 162 and transistor 163. This series regulator circuit generates a positive d.c. supply voltage on the emitter electrode of the transistor 163 which electrode is connected to the convertor output terminal 164. The supply voltage generated on the output terminal 164 is the hereinbefore mentioned reference voltage $V_R$.

To operate the distance measuring system 11, its power supply is energized so that the laser diode 14 is pulsed or otherwise excited by the light source amplifier 12. The light emitted by the laser diode 14 is collimated by the lens 15 to form the collimated light beam A.

The position of the measuring system 11 is next adjusted with respect to the target T until the system 11 gives an output. The presence of an output signal indicates that the target T is being illuminated by the light beam A and that the reflected light B from the beam A is being reflected back to and sensed by the light detectors 20 and 21.

The output of the system 11, which is displayed by the display 60, is a measure of the range R to the target T and is computed by the operation of the system 11 in the hereinafter described manner. The basic principle upon which the system 11 operates is that the intensity of light or electromagnetic energy radiated from a point source varies inversely in proportion to the distance from the point source.

As beforementioned, the reflected light B appears to radiate from a point light source on the target T. This apparent point light source is referred to herein as the target source and its intensity is designated $I_0$. The intensities of light sensed by the light detectors may thus be expressed by the following equations, where $I_1$ equals the light intensity sensed by the light detector 20, $I_2$ equals the light intensity sensed by the light detector 21, $I_0$ is the intensity of the apparent target source, R is the unknown distance from the light detector 20 to the target T which distance is to be measured, and X is the known difference in range between the light detectors 20 and 21. The equations are:

$$I_1 = I_0/R^2 \qquad (1)$$

$$I_2 = I_0/(R+X)^2 \qquad (2)$$

The equation (2) may be written in the manner shown below by dividing the numerator and denominator of its righthand side by $R^2$.

$$I_2 = I_0/R^2/(1+X/R)^2 \quad (3)$$

The distance measuring system 11 operates to solve the equation three on a derivative thereof in the following manner. As hereinbefore explained, the intensity $I_1$ of the light detected by the light detector 20 is maintained constant by controlling the intensity of the light beam A. The intensity of the light beam A being generated is appropriately controlled and varied by the voltage control signals generated in the feedback loop by the gain control amplifier 13.

Therefore, since $I_1$ is maintained constant and $I_1$ equals $I_0/R^2$, it follows that the equation three may be rewritten as shown below by substituting a constant K for the quantity $I_0/R^2$.

$$I_2 = K/(1+X/R)^2 \quad (4)$$

Since in equation (4), X and K are constants and $I_2$ is measured in the system 11 by the light detector 21, it follows that the light intensity $I_2$ detected by the detector 21 and appearing as an amplified output on terminal 42 of the range channel is a measure of the distance R to the target T. Thus, the system 11 solves equation (4) for the quantity R and generates on the range channel output terminal 42 a voltage signal which is nonlinearly proportional to the distance R. The nonlinear relationship between the voltage representing $I_2$ and the distance R is in accordance with the equation (4).

In the system 11, the differential amplifier 36 combines the amplified output voltages on the channel terminals 32 and 42. The output voltages on the terminals 32 and 42 represent and are proportional to the detected light intensities $I_1$ and $I_2$, respectively. The differential amplifier 36 generates a differential output which is proportional to the difference between the detected light intensities $I_2$ and $I_1$. Thus, the differential output signal of the amplifier 36 represents the quantity $I_2-I_1$. Since, as beforementioned, the light intensity $I_1$ is maintained constant by the system 11, the differential output signal $I_2-I_1$ is thus also nonlinearly proportional to the target distance R.

The output signal processor 50 operates in the system 11 to nonlinearly amplify the differential output signal $I_2-I_1$ and generates a range output signal across the terminals 52 which is a linear measure of the range R to the target T. This linear output representing target distance R is displayed by the display 60 in a conventional manner so that the target distance R measured by the system 11 may be readily determined from the reading or indication on the display 60.

It is noted that the maximum range capability of the distance measuring system 11 may be increased by employing a lens means to increase the effective or equivalent displacement in range between the light detectors 20 and 21. Such a lens means 170 is shown in dashed lines in FIG. 1 positioned ahead and in front of the light detector 21.

The lens 170 is preferably displaced in range the known distance X ahead of the focusing lens 24 of the detector 21. The lens 170 is positioned to intercept the reflected light $B_2$ and direct it to the focusing lens 24. The lens 170 further has a known focal length $f$ which is greater than the distance X. With the distance X less than the focal length $f$, the expression for the sensitivity of the system 11 to target distance, equation (4) becomes:

(Equation 5)

$$I_2 = \frac{K}{\left(1-\frac{X}{f}+\frac{X}{R}\right)^2} = \frac{K}{\left(1-\frac{X}{f}\right)^2 \left[1+\frac{X}{R\left(1-\frac{X}{f}\right)}\right]^2} \quad (5)$$

Thus, the incorporation of the focusing lens 170 into the system 11 has caused the effective distance between the light detectors 20 and 21 to increase by a factor of $(1/1-X/f)$.

It is noted that the distance measuring system 11 above described operates to reflect electromagnetic energy of predetermined frequency characteristics, i.e., infrared light, of varying intensity from the target T to maintain the intensity of the target reflected energy at a second position spaced apart a predetermined distance in range from the first position, thereby to obtain a measure of target range. The second position is the location of the detector 21 which is displaced the distance X in range from the detector 20.

Thus, there has been provided an improved system and method for measuring target distance by reflecting electromagnetic energy in the form of infrared light from a target. The system and method compensates for differences in target absorption and reflection characteristics.

Although the invention has herein been described in what is conceived to be the preferred embodiment, it is recognized that departures may be made therefrom within the scope of the invention.

What is claimed is:

1. A distance measuring system, comprising:

a voltage controlled light source means for generating a variable intensity light beam to illuminate a target, said light source means being operable to generate said light beam at an intensity directly proportional to the magnitude of the voltage controlling its operation;

first light detector means for detecting the intensity of light, said first detector means being positioned relative to said light source means to receive a first portion of light from said light beam reflected from said target, said first detector means being responsive to the intensity of said first reflected light portion to generate a first electrical signal directly proportional thereto;

means responsive to said first electrical signal for generating a control voltage inversely proportional thereto, said control voltage generating means being connected to supply said control voltage to said light source means to control the operation of said light source means whereby the intensity of said light beam being generated is varied in proportion to the intensity of said first reflected light portion being detected so that the detected intensity of said first reflected light portion is maintained substantially constant; and, second light detector means for detecting the intensity of light, said second detector means being positioned relative to said light source means to receive a second portion of light from said light beam reflected from said target and being spaced apart in target range from said first detector means, said second detector means being responsive to the intensity of said second reflected light portion to generate a second electrical signal directly proportional thereto whereby said second electrical signal is a nonlinear function of the range to said target.

2. The invention recited in claim 1, including means responsive to said second electrical signal for generating and displaying an output signal which is a measure of the range to said target.

3. The invention recited in claim 1, including means responsive to said second electrical signal for generating and displaying an output signal which is linearly proportional to the range of said target.

4. The invention recited in claim 1, wherein said light source means comprises:
- a light emitting element;
- a voltage controlled amplifier connected to excite said light emitting element; and,
- a collimating lens positioned to collimate light emitted from said light emitting element thereby to form said light beam.

5. The invention recited in claim 4, wherein said light emitting element is a laser diode.

6. The invention recited in claim 5, wherein said voltage controlled amplifier operates in a pulsed mode of operation to periodically generate pulses to excite said laser diode.

7. The invention recited in claim 1, wherein each of said detector means includes a light intensity detecting element and a focusing lens positioned ahead of said light intensity detecting element to focus light thereon.

8. The invention recited in claim 1, wherein said first detector means is positioned ahead of said second detector means so that the range to said second detector means is greater than the range to said first detector means.

9. The invention recited in claim 8, including lens means positioned ahead of said second detector means to intercept said second reflected light portion, said lens means being operable to direct said second reflected light portion onto said second detector means and to increase the effective displacement in target range between said first and second detector means.

10. The invention recited in claim 9, wherein said lens means has a known focal length and is positioned ahead of said second detector means a known distance in range less than said focal length.

11. A distance measuring system, comprising:
- a voltage controlled light source means for generating a variable intensity light beam to illuminate a target, said light source means being operable to generate said light beam at an intensity directly proportional to the magnitude of the voltage controlling its operation;
- first light detector means for detecting the intensity of light, said first detector means being positioned relative to said light source means to receive a first portion of light from said light beam reflected from said target, said first detector means being responsive to the intensity of said first reflected light portion to generate a first electrical signal directly proportional thereto;
- first amplifier and peak detector means responsive to said first electrical signal for generating a first amplified signal directly proportional thereto;
- gain control amplifier means responsive to said first amplified electrical signal for generating a control voltage proportional thereto, said gain control amplifier means being connected to supply said control voltage to said light source means to control the operation of said light source means whereby the intensity of said light beam being generated is varied in proportion to the intensity of said first reflected light portion being detected so that the detected intensity of said first reflected light portion is maintained substantially constant;
- second light detector means for detecting the intensity of light, said second detector means being positioned relative to said light source means to receive a second portion of light from said light beam reflected from said target and being spaced apart in target range from said first detector means, said second detector means being responsive to the intensity of said second reflected light portion to generate a second electrical signal directly proportional thereto;
- second amplifier and peak detector means responsive to said second electrical signal for generating a second amplified electrical signal directly proportional thereto; and,
- differential amplifier means responsive to said first and second amplified electrical signals for generating a differential output signal which is a nonlinear function of range to said target.

12. The invention recited in claim 11, including:
- signal processing means responsive to said differential output signal for nonlinearly amplifying said differential output signal to generate a range signal linearly proportional to target range; and,
- display means connected to said signal processing means for displaying said range signal.

13. The invention recited in claim 11, wherein said first detector means is positioned ahead of said second detector means so that the range to said second detector means is greater than the range to said first detector means.

14. The invention recited in claim 13, wherein:
- said light source means comprises a light emitting element, a voltage controlled amplifier connected to excite said light emitting element, and a collimating lens positioned to collimate light emitted from said light emitting element thereby to form said light beam; and,
- each of said detector means includes a light intensity detecting element and a focusing lens positioned ahead of said light intensity detecting element to focus light thereon.

15. The invention recited in claim 14, including:
- signal processing means responsive to said differential output signal for nonlinearly amplifying said differential output signal to generate a range signal linearly proportional to target range; and,
- display means connected to said signal processing means for displaying said range signal.

16. The invention recited in claim 15, including filter means connected in said distance measuring system for filtering said first and second amplified electrical signals, said filter means being operable to limit the frequencies of said first and second amplified electrical signals to a specified range.

17. The invention recited in claim 15, including lens means positioned ahead of said second detector means to intercept said second reflected light portion, said lens means being operable to direct said second reflected light portion onto said second detector means and to increase the effective displacement in target range between said first and second detector means.

18. The invention recited in claim 17, wherein said lens means has a known focal length and is positioned ahead of said second detector means a known distance in range less than said focal length.

19. A system for measuring range to a target, comprising:
   first and second light detector means each for detecting the intensity of light and generating an output signal proportional thereto, said first and second detector means being displaced with respect to each other a predetermined distance in target range; and,
   means for reflecting light from said target to each of said detectors and maintaining the intensity of reflected light detected by said first detector means substantially constant in response to its output signal whereby the output signal generated by said second detector means is proportional to and a measure of target range.

20. A system for measuring range to a target, comprising:
   first and second detector means each for detecting the intensity of electromagnetic energy of predetermined characteristics and generating an output signal proportional thereto, said first and second detector means being displaced with respect to each other a predetermined distance in target range; and,
   means for reflecting electromagnetic energy of said predetermined characteristics from said target to each of said detectors and maintaining the intensity of said reflected electromagnetic energy detected by said first detector means substantially constant in response to its output signal whereby the output signal generated by said second detector means is proportional to and a measure of target range.

21. A method for measuring range to a target, comprising:
   reflecting light of variable intensity from the target and maintaining the intensity of the target reflected light sensed at a first position constant by varying the intensity of the reflected light as a function of any change in reflected light at the first position; and
   sensing the intensity of the target reflected light at a second position spaced apart a predetermined distance in range from the first position thereby to obtain a measure of target range.

22. The method of claim 21, wherein the second position is located a greater distance in range from the target than the first position.

23. A method for measuring range to a target, comprising:
   reflecting electromagnetic energy of variable intensity from the target and maintaining the intensity of the target reflected electromagnetic energy sensed at a first position constant by varying the intensity of the reflected electromagnetic energy as a function of any change in the reflected electromagnetic energy at the first position; and,
   sensing the intensity of the target reflected electromagnetic energy at a second position spaced apart a predetermined distance in range from the first position thereby to obtain a measure of target range.

24. The method of claim 23, wherein the second position is located a greater distance in range from the target than the first position.

25. The method of claim 24, wherein the electromagnetic energy has predetermined frequency characteristics.

* * * * *